United States Patent [19]

Sharma

[11] Patent Number: 5,538,760
[45] Date of Patent: Jul. 23, 1996

[54] ALKYD/ACRYLIC LATEXES FOR CLEANING AND PROTECTING HARD SURFACES

[75] Inventor: Mahendra K. Sharma, Kingsport, Tenn.

[73] Assignee: Eastman Chemical Company, Kingsport, Tenn.

[21] Appl. No.: 446,130

[22] Filed: May 22, 1995

[51] Int. Cl.$^6$ ........................................................ B05D 5/00
[52] U.S. Cl. ................................... 427/388.4; 427/385.5; 427/389.7; 427/393; 427/393.5; 427/393.6; 523/502
[58] Field of Search ..................... 523/502; 427/385.5, 427/388.4, 389.7, 393, 393.6, 393.5

[56] References Cited

U.S. PATENT DOCUMENTS

| | | | |
|---|---|---|---|
| 4,451,596 | 5/1984 | Wilk | 523/502 |
| 4,528,318 | 7/1985 | Konishi et al. | 524/504 |
| 4,624,973 | 11/1986 | Kuwajima et al. | 523/221 |
| 4,747,880 | 5/1988 | Berrido et al. | 106/207 |
| 4,869,934 | 9/1989 | Jethwa | 427/393 |

*Primary Examiner*—Patricia A. Short
*Attorney, Agent, or Firm*—John D. Thallemer; Harry J. Gwinnell

[57] ABSTRACT

This invention relates to a method for cleaning and providing a protective shine to a hard surface. The method involves preparing an alkyd resin, dissolving the alkyd resin in one or more monoethylenically unsaturated monomers to form a mixture, dispersing the mixture in water in the presence of a surfactant to form an emulsion, and heating the emulsion to form an alkyd/acrylic latex which is applied to a hard surface.

17 Claims, No Drawings

5,538,760

ALKYD/ACRYLIC LATEXES FOR CLEANING AND PROTECTING HARD SURFACES

FIELD OF THE INVENTION

This invention relates to a method for cleaning and providing a protective shine to a hard surface by the application of an alkyd/acrylic latex.

BACKGROUND OF THE INVENTION

Formulations for cleaning hard surfaces usually contain acrylic polymers, detergent type surfactants, tripropylene glycol or a short chain alkyl ether of tripropylene glycol as a hydrophobic solvent, and other minor ingredients. Such formulations can be used to clean hard surfaces, but do not improve the shine of the hard surfaces. Likewise, there are formulations which improve the shine of hard surfaces, but do not clean the hard surface. Moreover, such formulations which provide a shine on hard surfaces usually require the hard surface to be cleaned prior to application. Accordingly, it is desirable to develop a product which cleans and provides a protective shine on hard surfaces.

U.S. Pat. No. 4,869,934 discloses an aqueous cleaning, coating and polishing composition containing an acrylic polymer, a styrene-acrylic copolymer, a plasticizer, an anionic or a nonionic fluorocarbon surfactant, a preservative, and ammonia to provide a pH of 8.0 to 9.6. The composition requires plasticizers to form a film on hard surfaces.

U.S. Pat. No. 4,624,973 discloses an aqueous coating composition containing at least one water-soluble resin selected from a polyester resin, an alkyd resin, an acrylic resin, and an acrylic-modified polyester resin, and at least one water insoluble resin. The solid weight ratio of water-soluble resin to the water insoluble resin was 99/1 to 15/85. The problem, however, with using acrylic polymers in such compositions are disadvantages which include lack-of flexibility, thermoplasticity, washability, and wet adhesion.

U.S. Pat. No. 4,747,880 discloses a dry, granular floor maintenance composition, which contains an alkaline buffer, a film forming wax, an alkali-soluble resin, a water softening agent, and a water-soluble builder.

U.S. Pat. No. 4,528,318 discloses an aqueous coating composition containing an alkyd/acrylic resin with a high acid number value in the range of 20–300 and a number average molecular weight of 500 to 30,000. The alkyd/acrylic resin is rendered dispersible in an aqueous medium by neutralizing unreacted carboxylic acid groups on the alkyd/acrylic resins with a basic substance.

SUMMARY OF THE INVENTION

The present inventor has developed a method for cleaning and shining hard surfaces by depositing a flexible film on hard surfaces. The method comprises the following steps:

(A) preparing an alkyd resin comprising repeat units from:
 (a) a fatty acid having the formula $CH_3(CH_2)_n COOH$ wherein n is 4 to 22,
 (b) a diol component selected from the group consisting of cycloaliphatic diols having 6 to 20 carbon atoms and aliphatic diols having 3 to 20 carbon atoms, and
 (c) a dicarboxylic acid component selected from the group consisting of aromatic dicarboxylic acids having 8 to 14 carbon atoms, aliphatic dicarboxylic acids having 4 to 12 carbon atoms, and cycloaliphatic dicarboxylic acids having 8 to 12 carbon atoms;

(B) dissolving 0.5 to 70 weight percent of said alkyd resin prepared in step (A) in one or more monoethylenically unsaturated monomers to form a mixture;

(C) dispersing said mixture prepared in step (B) in water in the presence of a surfactant to form an alkyd resin/acrylic monomer emulsion;

(D) heating said emulsion prepared in step (C) to a temperature of 30° C. to 85° C. to form an alkyd/acrylic latex which is applied to a hard surface.

DESCRIPTION OF THE INVENTION

The method of the present invention for cleaning and protecting hard surfaces involves preparing an alkyd/acrylic latex which is applied to the hard surfaces. The alkyd/acrylic latex is prepared from an alkyd resin and an acrylate resin. The term "latex" refers to a dispersion of the alkyd/acrylic polymer in water.

The alkyd resin contains a fatty acid, a dicarboxylic acid and a diol. The fatty acid is composed of a chain of alkyl groups containing from 4 to 22 carbon atoms and is characterized by a terminal carboxyl group. The fatty acid has the general structure $CH_3(CH_2)_n COOH$ wherein n is 4 to 22. The fatty acid may be saturated or unsaturated. Examples of fatty acids include: tall oil fatty acid (TOFA), linseed oil, soybean oil, coconut oil, castor oil, sunflower oil, safflower oil, tung oil, lauric, palmitic, stearic, oleic, linoleic and linolenic. The fatty acid may also include mixtures of fatty acids.

Depending on the oil type and composition, the saturated fatty acid contents vary in the range of 2.0 to 95.0 weight percent, whereas the unsaturated fatty acid contents vary from 10.0 to 98.0 weight percent. The saturated fatty acids content in the oils are mainly mixtures of stearic ($C_{18}$) and palmitic ($C_{16}$) acids, but various oils contain saturated fatty acids with $C_8$, $C_{10}$, $C_{14}$ carbon chain. The unsaturated fatty acids content in the oils are mainly oleic acid, linoleic acid and linolenic acid.

The diol component of the alkyd resin includes cycloaliphatic diols preferably having 6 to 20 carbon atoms or aliphatic diols preferably having 3 to 20 carbon atoms. Specific examples of diols are: ethylene glycol, diethylene glycol, triethylene glycol, 1,4-cyclohexanedimethanol, propane-1,3-diol, butane-1,4-diol, pentane-1,5-diol, hexane-1,6-diol, 2,2-dimethyl-1,3-propanediol, 1,10-decanediol, 2,2,4,4-tetramethyl-1,3-cyclobutanediol, 3-methylpentanediol-(2,4), 2-methylpentanediol-(1,4), 2,2,4-trimethylpentanediol-(1,3), 2-ethylhexanediol-(1,3), 2,2-diethylpropanediol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxy phenyl)-propane, and 2,2-bis-(4-hydroxy-propoxyphenyl)-propane. Preferably, the diol is diethylene glycol. The alkyd resin may be prepared from two or more diols.

The dicarboxylic acid component of the alkyd resin includes aromatic dicarboxylic acids preferably having 8 to 14 carbon atoms, aliphatic dicarboxylic acids preferably having 4 to 12 carbon atoms, or cyclo-aliphatic dicarboxylic acids preferably having 8 to 12 carbon atoms. Specific examples of dicarboxylic acids are 2,6-naphthalenedicarboxylic acid, terephthalic acid, dimethyl terephthalate, isophthalic acid, cyclohexanediacetic acid, diphenyl-4,4'- dicarboxylic acid, succinic acid, glutaric acid, adipic acid, fumaric acid, azelaic acid, sebacic acid, 2,7-naphthalenedicarboxylic acid, 1,4-cyclohexanedicarboxylic acid, resorcinoldiacetic acid, diglycolic acid, 4,4'-oxybis(benzoic) acid, biphenyldicarboxylic acid, 1,12-dodecanedicarboxylic acid, 4,4'-sulfonyldibenzoic acid, 4,4'-methylenedibenzoic acid, trans- 4,4'-stilbenedicarboxylic acid, and the like. Preferably, the dicarboxylic acid is terephthalic acid.

It should be understood that use of the corresponding acid anhydrides, esters, and acid chlorides of these acids is included in the term "dicarboxylic acid". The alkyd resin may be prepared from one or more of the above dicarboxylic acids or esters.

The acrylic resin is prepared from monoethylenically unsaturated monomers. Suitable monoethylenically unsaturated monomers include styrene, α-methyl styrene, methacrylate (MA), methylmethacrylate (MMA), ethyl acrylate (EA), butylacrylate (BA), butylmethacrylate (BMA), 2-ethylhexylacrylate (EHA), 2-hydroxyethyl acrylate (HEA), hydroxyethylmethacrylate (HEMA), acrylic acid (AA), acrylamide, maleic anhydride, acrylonitrile, and their derivatives. Preferably, the monoethylenically unsaturated monomer is methylmethacrylate.

The process for preparing the alkyd/acrylic latexes of the present invention involve polymerizing in the form of an emulsion the alkyd resin and monoethylenically unsaturated monomers with the addition of a surfactant and water. Any water soluble or dispersible surfactant with a hydrophilic-lipophilic balance (HLB) value greater than 7.0 can be used to stabilize the emulsion. The amount of surfactant used in emulsifying ingredient of the present invention is in the range of 0.01 to 1.0 wt %, preferably 0.05 to 0.5 wt % based on total weight of emulsion latex. The surfactant should provided small latex size particles with minimum incorporation of surfactant. Examples of surfactants include: ionic and nonionic surfactants such as alkyl polyglycol ethers such as ethoxylation products of lauryl, oleyl, and stearyl alcohols; alkyl phenol polyglycol ethers such as ethoxylation products of octyl- or nonylphenol, diisopropyl phenol, triisopropyl phenol; alkali metal ammonium salts of alkyl, aryl or alkylaryl sulfonates, sulfates, phosphates, and the like, including sodium lauryl sulfate, sodium octylphenol glycolether sulfate, sodium dodecylbenzene sulfonate, sodium lauryldiglycol sulfate, and ammonium tritertiarybutyl phenol and penta- and octa-glycol sulfonates, sulfosuccinate salts such as disodium ethoxylated nonylphenol half ester of sulfosuccinic acid, disodium n-octyldecyl sulfosuccinate, sodium dioctyl sulfosuccinate, and the like.

The surfactant can also be reactive anionic or nonionic surfactants possessing styrene or allyl groups. Examples include surface active monomers sold by PPG Industries, Inc., under the trademark SAM 181, 183, 184, and 211 which are anionic sulfates or sulfonates and SAM 185–187 which are nonionic. Other reactive surfactants include those sold by Daiichi Kogyo Seiyaku under the trademark AQUARON. Examples of AQUARON surfactants includes compounds of the formulae

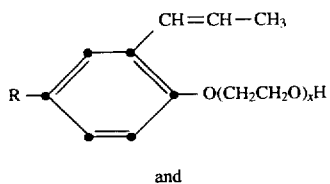

and

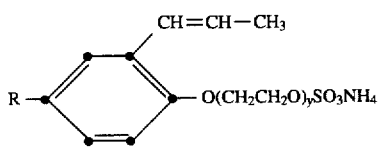

wherein R is a $C_1$–$C_{12}$ alkyl group and x and y are integers of from 1 to 5. Other reactive surfactants include the sodium alkyl allyl sulfosuccinate sold by Henkel, under the trademark TREMLF-40. The incorporation of large amount of surfactant into the alkyl/acrylic resin is deleterious to cleaning and protecting hard surfaces.

Inorganic and organic initiators can be used during polymerization of the emulsion. Useful initiators include: ammonium persulfate, potassium persulfate, hydrogen peroxide, dibenzoyl peroxide, lauryl peroxide, ditertiary butyl peroxide, 2,2'-azobisisobutyronitrile, t-butylperoxide, t-butyl hydroperoxide, benzoyl peroxide, sodium formaldehyde sulfoxylate and the like. A preferred initiator is ammonium persulfate.

In a preferred embodiment of this invention, a 10 to 30 weight percent portion of the emulsion is heated to 30° to 85° C., preferably 50° to 70° C., and an aqueous solution of initiator and any remaining emulsion is slowly injected into the reaction mixture.

Many other additives can be employed to the latexes of the present invention to enhance the cleaning, shining, and protecting properties of the latexes. For example, a wetting agent, leveling agent, defoaming agent, solvent, filler, lubricant, ultraviolet light absorbing agent, preservative, and antioxidant can be included herein. Examples of suitable additives also include fillers, such as potassium tripolyphosphate, sodium hexametaphosphate, sodium acid pyrophosphate, sodium tripolyphosphate, sodium tripolyphosphate hexahydrate, tetrapotassium pyrophosphate, tetrasodium pyrophosphate, trisodium phosphate, disodium phosphate, sodium silicate, sodium metasilicate pentahydrate, and sodium aluminosilicate; defoamers such as 2-ethylhexanol, hydrocarbon oil, silicone compounds, silicone emulsions, siloxane, fatty acid sulfonate, polyols, block polyol, glyceryl mono- and dioleate, petroleum oil, oleyl alcohols, ammoniac fluorinated compound, glycols, pine oil, esters of vegetable oil fatty acids, polypropylene glycols, iso-eicosyl alcohol, 1-eicosanol, 1-docosanol, fatty acids; solvents such as acetone, dipropylene glycol, diethylene glycol, ethylene glycol, propylene glycol, esters and ketones, ether, butanol, butyl acetate, isobutyl acetate, ethylene glycol monobutyl ether acetate, ethylene glycol monobutyl ether, ethylene glycol monoethyl ether, castor oil, diacetone alcohol, diisobutyl carbinol, diisobutyl ketone, and methyl ethyl ketone; leveling agents such as solvents, acrylic resins, urea resins, melamine resins, cellulose acetobutyrates, dimethylpolysiloxanes, methylphenylpolysiloxane, organically modified polysiloxanes, and fluorocarbons; as well as mixtures of any two or more of the above mentioned classes of compounds, or mixtures of two or more compounds from within a given class of compound.

The alkyd/acrylic latexes may be applied to any hard surface to clean and protect the surface. Examples of suitable hard surfaces include concrete, tile, wood, formica, metal, glass, ceramic and the like. The compositions provide hard surfaces with a flexible, glossy protective film. By varying the ratio of the alkyd resin and monoethylenically unsaturated monomers in the emulsion, latexes with different polymer properties can be prepared.

The materials and testing procedures used for the results shown herein are as follows:

The following alkyd resins were used in the examples:

Alkyd Resin A was prepared with 1.345 moles of tall oil fatty acid, 1.513 moles of trimethylolpropane, and 1.009 moles of isophthalic acid. Alkyd Resin A had a number average molecular weight of 1367.0 and an acid number of 1.47.

Alkyd Resin B was prepared with 1.723 moles of tall oil fatty acid and 1.723 moles of trimethylolpropane. Alkyd Resin B had a number average molecular weight of 388.2 and an acid number of 2.48.

Alkyd Resin C was prepared with 0.924 moles of tall oil fatty acid, and 0.924 moles of trimethylolpropane, and 1.102 moles of 1,4-cyclohexanedicarboxylic acid. Alkyd Resin C had a number average molecular weight of 1189.0 and an acid number of 3.05.

Alkyd Resin D was prepared with 1.635 moles of tall oil fatty acid and 2.452 moles of neopentylglycol. Alkyd Resin D had a number average molecular weight of 273.5 and an acid number of 2.95.

Alkyd Resin E was prepared with 1.744 moles of linseed oil and 1.774 moles of trimethylolpropane. Alkyd Resin E had a number average molecular weight of 376.6 and an acid number of 3.12.

Alkyd Resin F was prepared with 2.767 moles of tall oil fatty acid and 1.844 moles of trimethylolpropane.

Alkyd Resin F had a number average molecular weight of 528.7 and an acid number of 1.90.

The method of the present invention will be further illustrated by a consideration of the following examples, which are intended to be exemplary of the invention.

EXAMPLE 1

This example illustrates the preparation of alkyd/acrylic latexes having the following composition:

| Ingredient | Amount (g) | (weight %) |
|---|---|---|
| Alkyd Resin A | 100.0 | 14.07 |
| Styrene | 50.0 | 7.03 |
| Methylmethacrylate | 150.0 | 21.10 |
| ABEX EP-100 (25% solid in H$_2$O) | 10.0 | 1.41 |
| Ammonium persulfate | 0.8 | 0.11 |
| Water | 400.0 | 56.28 |

(1) Alkyd resin A was prepared by heating 1.345 moles of TOFA, 1.513 moles of TMP, 1.009 moles of IPA, and 1.0 gram of FASCAT 4100 (catalyst) at 220° C. until the distillate (H$_2$O) was collected for desired acid value.

(2) The alkyd resin from step (1) was dissolved in a mixture of styrene and methylmethacrylate (MMA) by stirring with a magnetic stirrer.

(3) Aqueous ABEX EP-100 solution, 10 gram in 300 gram H$_2$O, was added slowly to the alkyd resin/acrylic acid monomer mixture prepared in Step (2), during mixing with Ross Mixer to prepare an oil/water emulsion.

(4) About ¼ of the emulsion prepared in Step (3) was poured in a reactor. The reactor content was heated to 60°–70° C. At about 70° C., aqueous ammonium persulfate solution, 0.8 gram in 100 gram H$_2$O, was pumped into the reactor over a period of 2 hours while continuous stirring.

(5) After pumping catalysts, reactor temperature was maintained at 70° C. for an additional hour to complete polymerization.

(6) The alkyd/acrylic latex was allowed to cool and was stored in a container. An average particle size of the latex was 106.9 nM. The Mn was 957, and Mw was $1.05 \times 10^5$. The alkyd/acrylic latex Tg was 86.6° C. as measured by DSC. The hydroxyl number was 21.05 mg KOH/g polymer.

EXAMPLE 2

Example 1 was repeated with the exception that Alkyd Resin A/monoethylenically unsaturated monomer ratio was 1:1 instead of 1:2 as in Example 1. The styrene/MMA ratio was maintained at 1:3. The latex was not stable due to large particles which settled in the reactor. Thus, an alkyd resin/monoethylenically unsaturated monomer ratio of 1:1 does not form a stable latex.

EXAMPLE 3

Example 1 was repeated with the exception that Alkyd Resin A/monoethylenically unsaturated monomer ratio was 2:1 instead of 1:2 as in Example 1. The latex was not stable due to large particles which settled in the reactor. Thus, an alkyd resin/monoethylenically unsaturated monomer ratio of 2:1 does not form a stable latex.

EXAMPLE 4

Example 1 was repeated with the exception that Alkyd Resin B was used instead of Alkyd Resin A in preparing an alkyd/acrylic latex. The monoethylenically unsaturated monomers used were styrene/methylmethacrylate/2-ethylhexylacrylate in a ratio of 25/32/43, respectively. The latex composition was as follows:

| Ingredient | Amount (g) | (weight %) |
|---|---|---|
| Alkyd Resin B | 60.0 | 13.18 |
| Styrene | 35.0 | 7.69 |
| Methylmethacrylate | 45.0 | 9.88 |
| 2-Ethylhexylacrylate | 60.0 | 13.18 |
| ABEX EP-100 (25% solid in H$_2$O) | 5.0 | 1.09 |
| Ammonium per sulfate | 0.4 | 0.09 |
| Water | 250.0 | 54.89 |

The alkyd/acrylic latex was stable. An average particle size of the latex was 106.7 nM. The dry polymer latex had the following properties: Mn was 1420.7 and Mw was $5.54 \times 10^4$. The latex Tg was −18.93° C. as measured by DSC. The hydroxyl value was 123.3.

EXAMPLE 5

Example 1 was repeated with the exception that Alkyd Resin C was used instead of Alkyd Resin A to prepare alkyd/acrylic latexes. The following ingredients were used.

| Ingredient | Amount (g) | (weight %) |
|---|---|---|
| Alkyd Resin C | 60.0 | 13.08 |
| Styrene | 30.0 | 6.54 |
| Methylmethacrylate | 60.0 | 13.08 |

| Ingredient | Amount (g) | (weight %) |
|---|---|---|
| 2-Ethylhexylacrylate | 50.0 | 10.90 |
| ABEX EP-100 | 8.3 | 1.81 |
| (25% solid in H$_2$O) | | |
| Ammonium per sulfate | 0.4 | 0.09 |
| Water | 250.0 | 54.50 |

The solid content in the alkyd/acrylic latex was 42.60%. An average particle size of the latex was 77.1 nM. The latex was stable. The dry polymer obtained from the latex had the following properties: Mn was 6499.9 and Mw was 4.11×10$^5$. The latex Tg was 3.22° C. as measured by DSC. The acid number was 5.38 mg KOH/g polymer. The hydroxyl value was 117.3.

EXAMPLE 6

Example 5 was repeated with the exception that a mixture of surfactants, 50/50 ratio of Abex EP-100/AQ-55, was used instead of only ABEX EP-100 in preparing an alkyd/acrylic latex. The alkyd/acrylic latex had an average particle size of 89.6 nM. The acid number was 3.5 mg KOH/g polymer.

EXAMPLE 7

Example 1 was repeated with the exception that Alkyd Resin E was used instead of Alkyd Resin A in preparing an alkyd/acrylic latex. The stable latex that resulted had an average particle size of 109.5 nM.

EXAMPLE 8

Example 1 was repeated with the exception that Alkyd Resin C was used instead of Alkyd Resin A in preparing an alkyd/acrylic latex. The latex composition was as follows:

| Ingredient | Amount (g) | (weight %) |
|---|---|---|
| Alkyd Resin C | 100.0 | 14.76 |
| Styrene | 40.0 | 5.90 |
| Methylmethacrylate | 120.0 | 17.71 |
| Butylmethacrylate | 40.0 | 5.90 |
| ABEX EP-100 | 12.0 | 1.77 |
| (25% solid in H$_2$O) | | |
| Ammonium per sulfate | 0.6 | 0.09 |
| Water | 365.0 | 53.87 |

The solid content in the alkyd-acrylic latex was 52.8%. An average particle size of the latex was 107.5 nM. The alkyd ex was stable. The dry polymer obtained from the latex had the following properties: Mn was 2782.53 and Mw was 89,165. The latex Tg was 54.2° C. as measured by DSC. The acid number was 3.46 mg KOH/g polymer. The hydroxyl value was 19.18.

EXAMPLE 9

An acrylic latex was prepared by emulsion polymerization without incorporating an alkyd resin. The acrylic latex had the following composition:

| Ingredients | Amount (g) | (weight %) |
|---|---|---|
| Methylmethacrylate | 225.0 | 35.52 |
| ABEX EP-100 | 8.0 | 1.26 |
| Ammonium per sulfate | 0.6 | 0.09 |
| Water | 400.0 | 63.13 |

The acrylic latex was prepared using the apparatus and conditions as described in Example 1 except that no alkyd resin was used. The acrylic latex contained 37.2% solid and was stable. The acrylic latex was mixed with Alkyd Resin A and Alkyd Resin B separately with stirring. The alkyd resins and acrylic latex separated into two phases when the stirring was stopped.

EXAMPLE 10

Example 1 was repeated with the exception that Alkyd Resin F was used instead of Alkyd Resin A in preparing an alkyd/acrylic latex using the process of the present invention. The latex composition was as follows:

| Ingredient | Amount (g) | (weight %) |
|---|---|---|
| Alkyd Resin F | 100.0 | 14.59 |
| Styrene | 70.0 | 7.86 |
| Methylmethacrylate | 70.0 | 7.86 |
| 2-Ethylhexylacrylate | 130.0 | 14.59 |
| ABEX EP-100 | 10.0 | 1.13 |
| (25% solid in H$_2$O) | | |
| Ammonium per sulfate | 0.8 | 0.09 |
| Water | 480.0 | 53.88 |

A stable alkyd/acrylic latex was formed having an average particle size of 242.1 nM. The Tg of dried polymer latex was −46.55° C.

EXAMPLE 11

Example 10 was repeated with the exception that Alkyd Resin A was used instead of Alkyd Resin F in preparing an alkyd/acrylic latex. The alkyd/acrylic latex composition was as follows:

| Ingredient | Amount (g) | (weight %) |
|---|---|---|
| Alkyd Resin A | 66.7 | 14.55 |
| Styrene | 10.0 | 2.18 |
| Methylmethacrylate | 40.0 | 8.73 |
| Butylacrylate | 73.4 | 16.01 |
| Acrylic Acid | 10.0 | 2.18 |
| ABEX EP-100 | 8.0 | 1.75 |
| (25% solid in H$_2$O) | | |
| Ammonium per sulfate | 0.3 | 0.07 |
| Water | 250.0 | 54.53 |

The solid content in the alkyd/acrylic latex was 40.0%. An average particle size of the latex was 92.3 nM. The alkyd/acrylic latex was stable. The dry polymer obtained from the latex had the following properties: Mn was 2733.5 and Mw was 66,549. The latex Tg was 6.5° C. as measured by DSC. The acid number was 35.45 mg KOH/g polymer.

EXAMPLE 12

The alkyd/acrylic latex prepared in Example 1 was used to form a film. The composition was as follows:

| Ingredients | Amount (g) | (weight %) |
| --- | --- | --- |
| Latex (42.0% solid) | 184.6 | 92.3 |
| MAZAWET-DF Surfactant | 4.0 | 2.0 |
| Isopropanol | 10.0 | 5.0 |
| Defoamer | 1.0 | 0.5 |
| Tektamer (preservative) | 0.4 | 0.2 |

The 2.0% MAZAWET surfactant was added as a coalescing agent and 5.0% isopropanol was added as a wetting agent. The MAZAWET and isopropanol were mixed slowly in the latex using a stirring device. The latex was applied to a metal panel with RK-Coater using different rods. The latex formed a film at room temperature. The film was examined for impact resistance. The film passed a 160/160 impact test without any damage to the film.

EXAMPLE 13

The alkyd/acrylic latex prepared in Example 5 was used to form a film on metal panels. The latex formed a clear film on the metal panels without coalescing agents. The film was glossy and flexible. In addition, the film passed a 160/160 lb impact without damaging the film.

EXAMPLE 14

The alkyd/acrylic latex prepared in Example 4 was applied to a clean vinyl composite tile and a formica surface. The alkyd/acrylic latex was diluted with water (50/50 wt./wt.). The alkyd/acrylic latex provided a glossy film with excellent adhesion to vinyl composite tiles and formica tops. The film provided an excellent water resistance to the surface, and maintained gloss even after wiping with water.

EXAMPLE 15

The waterborne alkyd/acrylic latex prepared in Example 4 was used to formulate a cleaner and a protectant. The formulation was as follows:

| Ingredients | Amount (g) | (weight %) |
| --- | --- | --- |
| Alkyd/Acrylic Polymer (38% solid) | 7.75 | 49.5 |
| Water | 3.50 | 22.3 |
| Primary alcohol ethoxylate (Nonionic surfactant) | 0.50 | 3.2 |
| EKTASOLVE EB (Glycol ether) | 2.50 | 16.0 |
| Terapotassium Pyrophosphate | 1.25 | 8.0 |
| Resinall 802 | 0.16 | 1.0 |

A base formulation was prepared by mixing all of the ingredients except polymer and Resinall 802. The base formulation was added slowly to the alkyd/acrylic polymer during mixing with a magnetic stirrer. After complete mixing, Resinall 802 was added slowly to the mixture while continuously stirring.

The formulated cleaner and protectant was applied with a cotton piece on Vinyl composite tiles and formica table tops. The product cleaned the surface and provided a shiny appearance, The gloss of the hard surface is improved by 10–15 units at 60 degree as measured by a Glossmeter.

EXAMPLE 16

Example 4 was repeated with the exception that the alkyd/acrylic ratio was 30/20 (wt/wt). The monoethylenically unsaturated monomers used were styrene/methylmethacrylate/2-ethylhexylacrylate in a ratio of 10/10/20, respectively. The latex composition was as follows:

| Ingredients | Amount (g) | (weight %) |
| --- | --- | --- |
| Alkyd Resin B | 120.0 | 26.35 |
| Styrene | 20.0 | 4.39 |
| Methylmethacrylate | 20.0 | 4.39 |
| 2-Ethylhexylacrylate | 40.0 | 8.78 |
| Abex-EP-100 (25% solid) | 5.0 | 1.10 |
| Ammonium per sulfate | 0.4 | 0.09 |
| Water | 250.0 | 54.90 |

The solid content in the alkyd/acrylic latex was 43.5 weight percent. The latex was stable. The average particle size of the latex was 102.0 nM.

EXAMPLE 17

The alkyd/acrylic latex prepared in Example 16 was diluted with water in a 50/50 wt./wt.). The alkyd/acrylic latex formed a glossy film on vinyl composite tiles and formica tops after drying. The film had excellent adhesion to the vinyl composite tiles and formica tops and could not be removed with water.

EXAMPLE 18

Example 16 was repeated with the exception that the alkyd/acrylic latex prepared in Example 16 was used instead of the alkyd/acrylic latex prepared in Example 4 in formulating a cleaner and protectant. The formulated product was applied with a cotton piece on vinyl composite tiles and formica tops. The formulated product on drying provided a clean and a glossy surface.

Many variations will suggest themselves to those skilled in this art in light of the above detailed description. All such obvious modifications are within the full intended scope of the appended claims.

What is claimed is:

1. A method for cleaning and protecting a hard surface, said method comprising the following steps:
   (A) preparing an alkyd resin comprising repeat units from:
      (a) a fatty acid having the formula $CH_3(CH_2)_nCOOH$ wherein n is 4 to 22,
      (b) a diol component selected from the group consisting of cycloaliphatic diols having 6 to 20 carbon atoms and aliphatic diols having 3 to 20 carbon atoms, and
      (c) a dicarboxylic acid component selected from the group consisting of aromatic dicarboxylic acids having 8 to 14 carbon atoms, aliphatic dicarboxylic acids having 4 to 12 carbon atoms, and cycloaliphatic dicarboxylic acids having 8 to 12 carbon atoms;
   (B) dissolving 0.5 to 70 weight percent of said alkyd resin prepared in step (A) in one or more monoethylenically unsaturated monomers to form a mixture;

(C) dispersing said mixture prepared in step (B) in water in the presence of a surfactant to form an alkyd resin/acrylic monomer emulsion;

(D) heating said emulsion prepared in step (C) to a temperature of 30° C. to 85° C. to form an alkyd/acrylic latex;

(E) incorporating an effective amount of additives in said alkyd/acrylic latex to form a cleaner and a shiner formulation; and (F) applying said alkyd/acrylic latex formulation prepared in step (E) to a hard surface.

2. The method as claimed in claim 1 wherein the fatty acid used to prepare the alkyd resin is selected from the group consisting of saturated and unsaturated fatty acids.

3. The method of claim 2 wherein the saturated fatty acid contents vary in the range of 2.0 to 95.0 weight percent, and the unsaturated fatty acid contents vary from 10.0 to 98.0 weight percent.

4. The method as claimed in claim 1 wherein the fatty acid used to prepare the alkyd resin is selected from the group consisting of tall oil fatty acid, linseed oil, soybean oil, coconut oil, castor oil, sunflower oil, safflower oil, tung oil, lauric, palmitic, stearic, oleic, linoleic and linolenic.

5. The method as claimed in claim 1 wherein the diol used to prepare the alkyd resin is selected from the group consisting of ethylene glycol, diethylene glycol, triethylene glycol, 1,4-cyclohexanedimethanol, propane-1,3-diol, butane-1,4-diol, pentane-1,5-diol, hexane-1,6-diol, 2,2-dimethyl-1,3-propanediol, 1,10-decanediol, 2,2,4,4-tetramethyl-1,3-cyclobutanediol, 3-methylpentanediol-(2,4), 2-methyl-pentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)benzene, 2,2- bis-(4-hydroxycyclohexyl)-propane, 2,4- dihydroxy-1,1,3,3-tetramethyl-cyclobutane, 2,2-bis-(3-hydroxyethoxy phenyl)-propane, and 2,2-bis-(4-hydroxypropoxyphenyl)-propane.

6. The method of claim 5 wherein the diol is diethylene glycol.

7. The method of claim 1 wherein the dicarboxylic acid used to prepare the alkyd resin is selected from the group consisting of 2,6-naphthalenedicarboxylic acid, terephthalic acid, dimethyl terephthalate, isophthalic acid, cyclohexanediacetic acid, diphenyl-4,4'-dicarboxylic acid, succinic acid, glutaric acid, adipic acid, fumaric acid, azelaic acid, sebacic acid, 2,7- naphthalenedicarboxylic acid, 1,4-cyclohexanedicarboxylic acid, resorcinoldiacetic acid, diglycolic acid, 4,4'-oxybis(benzoic) acid, biphenyldicarboxylic acid, 1,12-dodecanedicarboxylic acid, 4,4'-sulfonyldibenzoic acid, 4,4'-methylenedibenzoic acid, and trans-4,4'-stilbenedicarboxylic acid.

8. The method of claim 7 wherein the dicarboxylic acid is terephthalic acid.

9. The method of claim 1 wherein the monoethylenically unsaturated monomer is selected from the group consisting of styrene, α-methyl styrene, methacrylate (MA), methylmethacrylate (MMA), ethyl acrylate (EA), butylacrylate (BA), butylmethacrylate (BMA), 2-ethylhexylacrylate (EHA), 2-hydroxyethyl acrylate (HEA), hydroxyethylmethacrylate (HEMA), acrylic acid (AA), acrylamide, maleic anhydride, and acrylonitrile.

10. The method of claim 9, wherein the monoethylenically unsaturated monomer is methylmethacrylate.

11. The method of claim 1 wherein step (D) is conducted at a temperature of 50° C. to 70° C.

12. The method of claim 1 wherein said surfactant is selected from the group consisting of an ionic and a nonionic surfactant.

13. The method of claim 1 wherein said surfactant has a hydrophilic-lipophilic balance value of at least 7.0.

14. The method of claims 1 wherein said surfactant is present in a range of 0.01 to 1.0 weight percent by total weight of said alkyd/acrylic latex.

15. The method of claim 14 wherein said surfactant is present in a range of 0.05 to 0.5 weight percent by total weight of said alkyd/acrylic latex.

16. The method of claim 1 wherein said additive is selected from the group consisting of a wetting agent, leveling agent, defoaming agent, solvent, filler, lubricant, ultraviolet light absorbing agent, preservative, and antioxidant.

17. The method of claim 1 wherein said hard surface is selected from the group consisting of tile, concrete, wood, formica, metal, glass and ceramic.

\* \* \* \* \*